(12) United States Patent
Meyer et al.

(10) Patent No.: US 6,615,682 B2
(45) Date of Patent: Sep. 9, 2003

(54) DEVICE AND METHOD FOR SELECTING A GUTTER OF A TRANSMISSION

(75) Inventors: Roland Meyer, Roth (DE); Andreas Wild, Unterensingen (DE); Thomas Schmidt, Regensburg (DE); Wolfgang Weigert, Tegernheim (DE)

(73) Assignee: Hydraulik-Ring GmbH, Nürtingen (DE)

( * ) Notice: Subject to any disclaimer, the term of this patent is extended or adjusted under 35 U.S.C. 154(b) by 0 days.

(21) Appl. No.: 10/093,356

(22) Filed: Mar. 7, 2002

(65) Prior Publication Data

US 2002/0170371 A1 Nov. 21, 2002

(30) Foreign Application Priority Data

Mar. 7, 2001 (DE) .......................................... 101 01 981

(51) Int. Cl.[7] .......................... F16H 59/00; F16H 61/00; F16H 63/00; B60K 17/10; B62K 25/00
(52) U.S. Cl. .................... 74/335; 74/473.11; 74/473.13; 74/473.3
(58) Field of Search ............................. 74/335, 473.11, 74/473.12, 473.13, 473.3, 503

(56) References Cited

U.S. PATENT DOCUMENTS

| | | | | |
|---|---|---|---|---|
| 2,684,600 A | * | 7/1954 | Naumann | 74/473.26 |
| 5,060,538 A | * | 10/1991 | Schnell et al. | 74/473.28 |
| 5,481,877 A | * | 1/1996 | Bakke et al. | 60/571 |
| 6,065,363 A | * | 5/2000 | Schaller et al. | 74/473.12 |
| 6,170,352 B1 | * | 1/2001 | Neubauer et al. | 74/473.11 |
| 6,357,315 B1 | * | 3/2002 | Smith et al. | 74/473.11 |

FOREIGN PATENT DOCUMENTS

DE 199 31 973 1/2001

OTHER PUBLICATIONS

Yamamoto Yasushi; Patent Abstracts of Japan; Publ. No. 10141499A; May 29, 1998.

* cited by examiner

Primary Examiner—Sherry Estremsky
Assistant Examiner—Tisha D. Lewis
(74) Attorney, Agent, or Firm—Gudrun E. Huckett

(57) ABSTRACT

An actuator for gutter selection in a gear positioning device for an automatic manual transmission has a selector shaft with a selector finger. A gutter selection device is movable back and forth along an axis into a first position and a second position. The selector finger of the selector shaft can move into engagement and out of engagement with the gutter selection device. A single valve device is provided for determining the first and second positions of the gutter selection device.

16 Claims, 4 Drawing Sheets

DEVICE AND METHOD FOR SELECTING A GUTTER OF A TRANSMISSION

BACKGROUND OF THE INVENTION

1. Field of the Invention

The present invention relates to a device for gutter selection in a transmission, in particular, in AMT systems (automatic manual transmission) as well as a method for the gutter selection in a transmission.

2. Description of the Related Art

In so-called automatic manual transmissions (AMT) the gears of the transmission are shifted by means of an electro-hydraulic actuator. In this connection, the actuator for a transmission with an "H" shifting pattern is configured of several pistons and corresponding mechanisms in order to carry out the gear shifting movement and/or gutter movement.

Such an actuator is known, for example, from DE 199 31 973 A1. In this connection, a complexly configured unit comprised of actuating devices, sensors, and valve devices is proposed in order to move a selector finger in a gutter of the transmission.

In FIG. 5, a different gutter selection actuator is illustrated. As shown in FIG. 5, the actuator comprises six piston elements 31, 32, 33, 34, 35, and 36 in order to position the selector shaft 37 in one of the transmission gutters N1, N2, N3 or N4. The position of the piston units 31 through 36 is determined by control of two switching valves SV1 and SV2. Such an actuator requires a complex mechanical configuration and has a plurality of components. This results in an increased manufacturing expenditure and a highly branched hydraulic line system. Moreover, a control must be provided in order to control the two switching valves SV1 and SV2.

SUMMARY OF THE INVENTION

It is therefore an object of the present invention to provide a device as well as a method for gutter selection which enables a safe and reliable gutter selection while providing a simple configuration and a simple, inexpensive manufacture.

This object is solved by an actuator for gutter selection comprising a selector shaft with a selector finger and a gutter selection device which is movable back and forth along an axis in order to assume a first position and a second position, wherein the selector finger of the selector shaft can be moved into engagement and out of engagement with the gutter selection device and wherein the position of the gutter selection device can be determined by means of precisely one valve device. The object is further solved by a method for gutter selection comprising the steps of positioning the gutter selection device, movable back and forth along an axis, in a first position depending on the desired next gutter selection; connecting a selector shaft with the gutter selection device; moving the gutter selection device with the selector shaft into a second position so that the selector shaft is positioned in a neighboring gutter; and disengaging the selector shaft from the gutter selection device in order to shift a gear, wherein the movement of the gutter selection device from the first position into the second position is carried out by means of precisely one valve device. Advantageous embodiments are the subject matter of the dependent claims, respectively.

According to the invention, an actuator for gutter selection of a gear positioning device for an automatic manual transmission is thus proposed which comprises a selector shaft with a selector finger and a gutter selection device. The gutter selection device is movable back and forth along an axis and, in this connection, assumes a first position and a second position. In this way, the gutter selection device can assume only precisely two positions. In this connection, the selector finger of the selector shaft can be engaged with and disengaged from the gutter selection device. The position of the gutter selection device is determined in this connection by precisely one valve device.

Accordingly, the gutter selection actuator according to the invention is of a very simple configuration because the selection of the gutter can be realized with a single valve device. In this connection, only one gutter selection device is required which is controlled by the only valve and which must perform only an axial reciprocating movement in order to perform the gutter selection. Accordingly, the actuator according to the invention for gutter selection only has a minimal number of components so that a minimal manufacturing expenditure and a minimal assembly expenditure result. Accordingly, the actuator according to the invention for gutter selection can be manufactured significantly less expensively in comparison to previously employed gutter selection actuators. Due to the minimal number of components the reliability of the system can also be improved.

Moreover, since only one valve device is employed, savings in regard to electronic compounds and in regard to a wiring harness result also, since only one valve device must be controlled. Moreover, the system according to the invention does not require a sensor because the position of the gutter selection device is determined simply by the position of the valve device. Accordingly, no redundancy sensor is necessarily required which could maintain an emergency operation when the sensor fails. Since the gutter selection device and the selector finger are completely out of engagement after gutter selection, it is also ensured that, when the gear is engaged, no forces are exerted by the gutter actuator onto the transmission. This increases the service life of the transmission.

Preferably, the gutter selection device is embodied as a piston which is loaded with a pressure medium. In this connection, the piston can be guided simply in a housing and can have a simple configuration. The control of the piston is realized in this connection via the valve device which supplies the pressure medium to the piston. The pressure medium is preferably a hydraulic liquid.

It is especially preferred to embody the piston as a double-action piston. In this connection, the valve device controls the piston on a certain piston end as a function of the position of the piston. Preferably, the piston has two piston surfaces with differently sized surface areas. This enables that the piston can be loaded on both surfaces with a control pressure of the same magnitude and that the piston is always in a defined position.

Advantageously, the gutter selection device is provided with cutouts for engagement by the selector finger. In this way, a positive-locking connection between the gutter selection device and the selector finger can be provided.

Preferably, the cutouts are arranged such on the gutter selection device that the selector finger can engage the gutter selection device by means of a pivot movement. This enables a simple and safe course of movement for the selector finger for engaging and releasing the gutter selection device.

Preferably, the selector finger can pivot in two directions in and out of the gutter selection device. In this way, the individual gears can be selected by a direct pivot movement out of the gutter selection device. This enables an especially compact configuration.

Preferably, the number of cutouts provided in the gutter selection device is smaller by one compared to the number of the gutters of the transmission. This means that when the transmission has, for example, four gutters, the gutter selection device has three cutouts. In this way, the constructive size of the gutter selection device can be kept small.

Preferably, the stroke of the piston (gutter selection device) matches the spacing of two neighboring gutters of the transmission. This ensures that the selector finger or the selector shaft are moved precisely by one next gutter.

In order to provide an additional safety device in regard to the position of the gutter selection device, a sensor is preferably provided in order to determine the position of the gutter selection device. As has been explained before, the position of the gutter selection device can also be determined according to the invention simply by the position of the valve device.

In order to enable for a shifting process a skipping of gutters, the selector finger can be moved into an intermediate position in which it is out of engagement with the gutter selection device as well as with the transmission. This makes it possible that the gutter selection device can be returned into its other position (initial position), and the selector finger can subsequently engage the gutter selection device and, by movement of the gutter selection device, can be moved into the next gutter. Accordingly, during the shifting action a gutter can be skipped without this requiring the shifting of a gear in the skipped gutter.

Preferably, the valve device is a 3/2 directional control valve. In this way, it can be manufactured simply and inexpensively and provides a simple and reliable control action.

According to the method of the invention for gutter selection in a gear positioning device for an automatic manual transmission, in a first step a gutter selection device, movable along an axis in a reciprocating fashion, is fixed in position. In this connection, the gutter selection device can assume only two positions. Possibly, a positioning of the gutter selection device is carried out only when the momentary position does not correspond to the desired initial position. Positioning is realized depending on the desired next gutter selection (i.e., depending on the direction in which the next gutter, in which the desired gear is located, is positioned). In a second step, a selector shaft is connected by a selector finger with the gutter selection device, i.e., is engaged. In a third step, the gutter selection device with the selector shaft is moved into a second position (target position). In this way, the selector shaft is positioned in a gutter neighboring the original initial gutter. In a fourth step, a selector shaft is disengaged from the gutter selection device. For this purpose, the selector finger is moved out of the gutter selection device and the desired gear is shifted. In this connection, the movement of the gutter selection device is carried out only by means of precisely one valve device. With the method according to the invention, it is thus possible, in principle, to embody a gutter actuator in which a gutter is selected by using only two movement directions. In this connection, the movement directions are positioned on one axis and the gutter selection device is moved on the axis in opposite directions, respectively. In this way, the process of gutter selection can be significantly simplified.

In order to enable a safe movement between gutter selection device and selector finger, the selector shaft is advantageously movable into engagement and out of engagement with the gutter selection device by a pivot movement.

Preferably, the gutter selection device is embodied as a piston having two piston surfaces and actuatable on both ends. This enables a particularly simple control of the gutter selection device. It is particularly preferred to load the two piston surfaces with the same control pressure, wherein the two piston surfaces are of different size. This enables a particularly simple control of the device according to the invention for gutter selection.

BRIEF DESCRIPTION OF THE DRAWINGS

In the following, the invention will be described by means of a preferred embodiment in connection with the drawing. In the drawing.

DESCRIPTION OF PREFERRED EMBODIMENTS

In the following, with the aid of FIGS. 1 through 4, one embodiment according to the present invention will be described.

Figure 3:
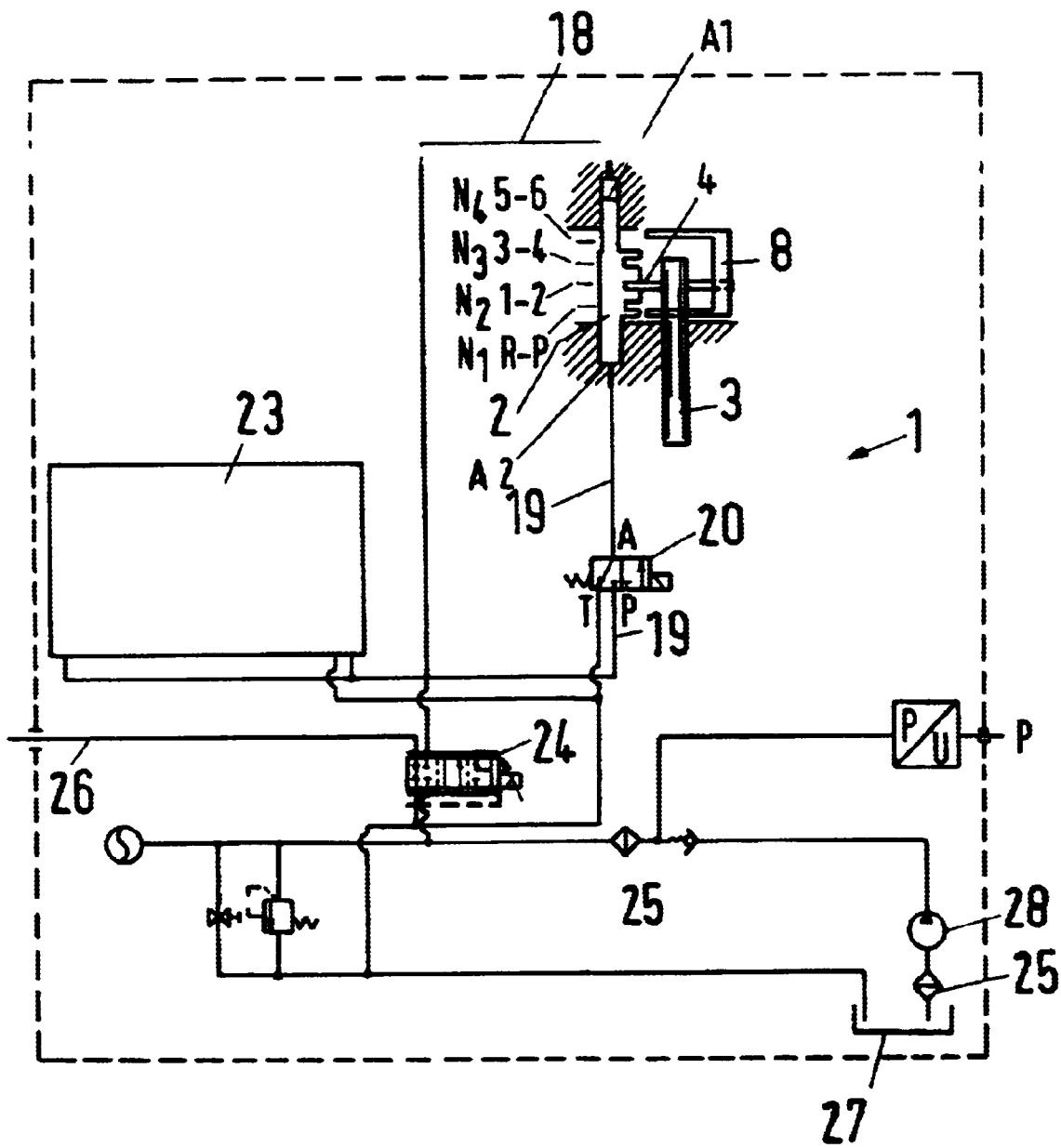
FIG. 3 is a schematic hydraulic connection diagram of the gutter selection actuator illustrated in FIGS. 1 and 2.

As illustrated in particular in FIG. 3, the actuator 1 comprises for gutter selection according to the embodiment of the present invention a gutter piston 2 as well as precisely one valve device 20. The valve device 20 is embodied as a 3/2 directional control valve and has a connector P for a system pressure, a connector T to the tank, and a connector A to the gutter piston 2.

Figure 4:
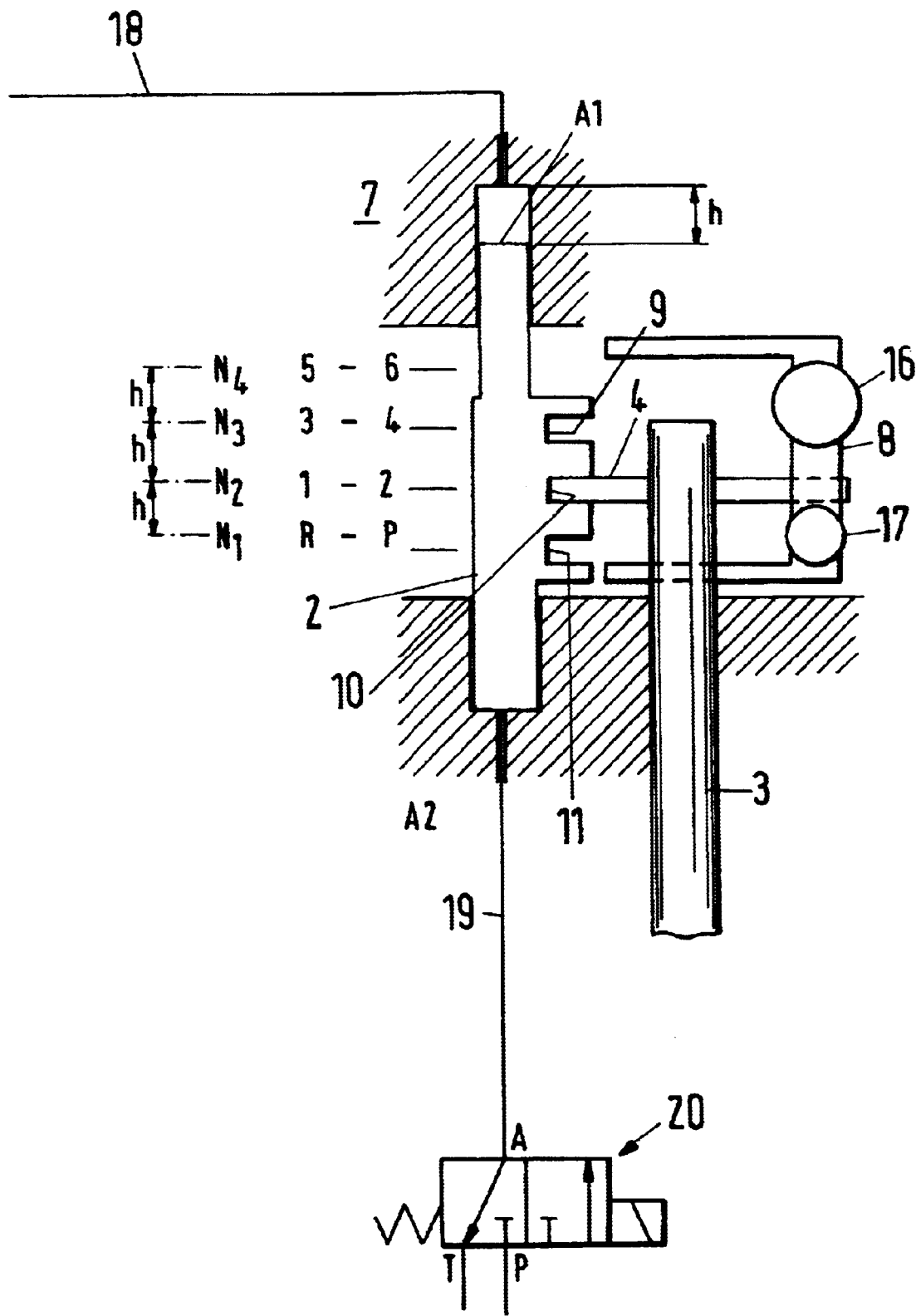
FIG. 4 is a schematic side view of the gutter selection actuator according to the embodiment.
Figure 5:
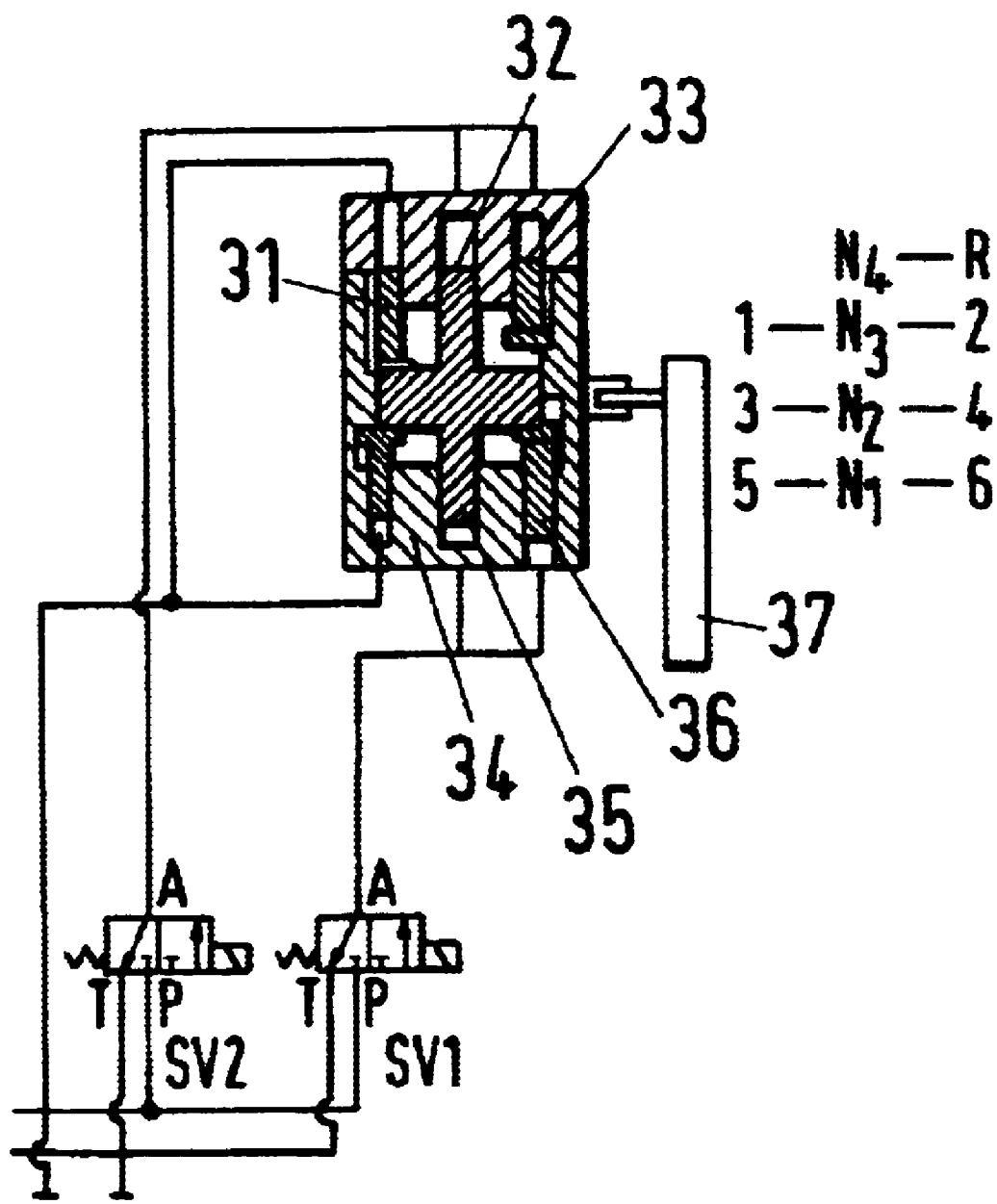
FIG. 5 is a schematic view of a gutter selection actuator according to the prior art.

The gutter piston 2 has at a central area three cutouts 9, 10, and 11 (compare FIG. 4). The gutter piston 2 is embodied as a double-action piston and has at its two ends in the longitudinal direction of the piston two working surfaces A1 and A2. In this connection, as illustrated in FIG. 4, the working surface A1 is smaller than the working surface A2. Preferably, the working surface A1 is only half the size of the working surface A2. The two piston ends of the gutter piston 2 are guided in cylindrical recesses in a housing 7.

Figure 1:
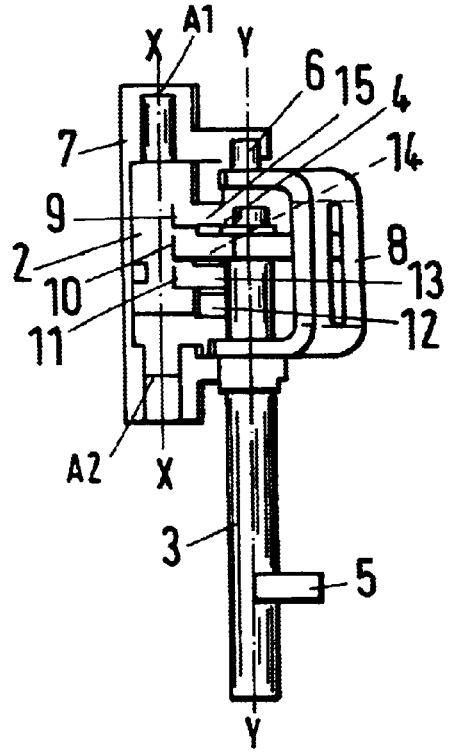
FIG. 1 is a schematic perspective partial view of a gutter selection actuator according to one embodiment of the present invention.
Figure 2:
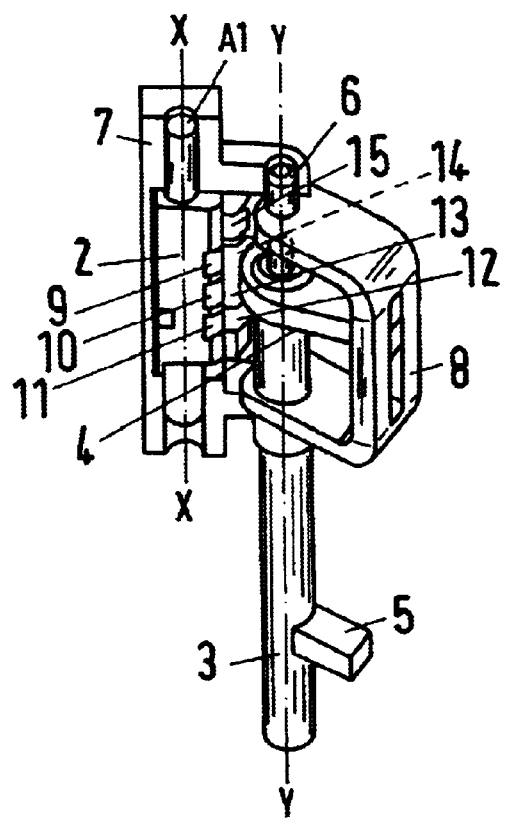
FIG. 2 is another schematic perspective partial view of the gutter selection actuator according to FIG. 1.

As shown in FIGS. 1 and 2, the gutter piston 2 is movable back and forth in its longitudinal direction along an axis X—X. In this connection, the gutter piston can assume two positions, i.e., a first position in which the gutter piston is arranged at the top and a second position in which the gutter piston is positioned at the bottom. For exact positioning, a stop for each movement direction can be provided, respectively. In the present embodiment the cylindrical recesses in the housing 7 serve as stops. In this connection, the piston has a stroke h (compare FIG. 4).

Moreover, a selector shaft 3 is provided which has a selector finger 4 which is fastened at one end of the selector shaft. The selector shaft 3 is supported pivotably about an axis Y—Y so that the selector finger 4 can be moved in and out of engagement with the gutter piston 2 by a pivot action.

The support of the selector shaft 3 is realized by means of a bracket 8 which is supported by means of a pin 6 in the housing 7 of the gutter selection actuator 1. Moreover, a projection 5 is provided on the selector shaft 3 which can be connected to a shifting lever mechanism.

As illustrated in particular in FIG. 2, the gear shifting planes 12, 13, 14, and 15, in which the gears are engaged, are arranged adjacent to the gutter piston 2. The engaged gear positions are arranged on both side of the gutter piston 2. The gear shifting planes 12, 13, 14 and 15 are located in different gutters N1, N2, N3, and N4 of the transmission, respectively.

More precisely, as shown in particular in FIG. 4, the reverse gear R and the parking position P are located in the first gutter N1 (plane 12), the first gear 1 and the second gear 2 are located in the second gutter N2 (plane 13), the third gear 3 and the fourth gear 4 are located within the third gutter N3 (plane 14) and the fifth gear 5 as well as the sixth gear 6 are positioned in the fourth gutter N3 (plane 15). The positions of the engaged gears are to the right and to the left of the gutter piston 2, respectively. The spacing of the individual gutters N1, N2, N3, and N4 from one another matches in this connection the stroke h (compare FIG. 4). Also, the spacing of the neighboring cutouts 9, 10, and 11 matches the stroke h.

In order to shift by means of the selector finger 4 the desired gear, the selector finger 4 is moved by means of the actuating pistons 16 and 17 which engage the bracket 8. In this connection, on both sides of the bracket 8 several actuating pistons are provided. It is noted that, instead of several actuating pistons on each side, one working pistons on one side and an auxiliary piston on the other side can be used, respectively. In FIG. 1, the selector finger 4 is engaged in the cutout 10 of the gutter piston in the gear shifting plane 14. In FIG. 2 the selector finger is shifted into a gear within the gear shifting plane 14. In FIGS. 3 and 4, the selector finger 4 engages the cutout 10 of the gutter piston 2.

As can be seen in the schematic hydraulic connection diagram illustrated in FIG. 3, the hydraulic oil, which is used as the pressure medium in the present case, is supplied from a tank 27 via a pump 28, the filtering devices 25, and a coupling valve 24 to a line 18 and a line 19 of the gutter selection actuator 1. The only valve device 20 of the actuator is arranged in the line 19. The line 18 is connected with the piston surface A1 and the line 19 is connected with the piston surface A2. Accordingly, both piston surfaces A1 and A2 of the gutter piston 2 are loaded with the same hydraulic control pressure. The coupling valve 24 serves in this connection only for supplying hydraulic pressure to the gutter actuator and has no function in regard to the actuation of the gutter actuator. Moreover, a coupling cylinder is supplied by a line 26 and a device 23 (gear actuator) for engaging and disengaging the gears In the following, the function of the gutter selection actuator according to the present invention will be described.

Before beginning a gear shifting action, the gutter piston 2 must be moved into a corresponding position. This means, when desiring a downward gutter shift (in the direction to the piston surface A2 in the Figures), the gutter piston 2 must be arranged in its upper first position. When desiring an upward gutter shift (in the Figures in the direction to the piston surface A1), the gutter piston 2 must be arranged in its lower second position.

When a gutter change is required in the transmission device for shifting into another gear, by means of a control controlling the valve 20 the gutter piston 2 is moved into the position which subsequently allows a movement of the gutter piston in the desired direction. When the movement direction of the gutter piston coincides with the direction in which the desired next gear is positioned, the selector finger 4 of the selector shaft 3 is pivoted into one of the cutouts 9, 10 or 11 provided in the gutter piston 2. Into which one of the cutouts 9, 10, or 11 the selector finger 4 is pivoted depends on the current position of the selector shaft 4 in one of the gutters N1 through N4.

When the selector finger 4 engages the gutter piston 2, the valve 20 is switched so that the gutter piston 2 is moved in the direction X—X into its other position. In this way, the selector finger 4 is positioned in the next gutter. Subsequently, the selector finger 4 is pivoted out of the gutter piston 2 to the left or to the right and the next gear is shifted in the transmission in this way. Whether the selector finger is moved to the left or to the right depends on which side of the gutter piston 2 the next desired gear is arranged.

Since after engaging the gear the selector finger 4 is completely disengaged from the gutter piston 2, it is ensured according to the invention that no forces are acting on the transmission via the gutter actuating system.

The gutter selection can be realized according to the invention simply by switching a single valve device 20. Since the working surfaces A1 and A2 of the gutter piston 2 have differently sized surface areas, the piston can be loaded on both ends with the same control pressure. According to the invention, only the movement of the gutter piston is encoded. Since the gutter piston however has only two movement directions (upwardly and downwardly), one valve device 20 is sufficient. In contrast to this, in the prior art the position of the selector shaft is encoded (four possible positions) which leads to a plurality of necessary valves and a complex control. Accordingly, the actuator according to the invention has only one valve device 20 and one piston 2. This allows a significant reduction of components in comparison to the prior art, and the control of the actuator can be simplified greatly. Moreover, a reduced weight as well as a higher reliability are achieved since fewer components are present and a reduced expenditure for the hydraulic system is required. Moreover, according to the invention, the complex sensor system can be eliminated.

A special advantage of the invention is thus that shifting is possible without employing a sensor. A sensor is needed only as a safety device for monitoring the gear. Even when the sensor fails, according to the invention it is possible to continue driving.

When for the selector finger 4, moreover, a parking position is provided in the gutters N2 and N3, in which parking position neither the selector finger is in engagement with the gutter piston nor the gear is engaged (a synchronization of the transmission has not yet taken place), one or several gutters can be skipped for each shifting action. In this connection, the gutter piston 2 is repositioned when the selector shaft 4 is in the parking position. For the first gutter N1 and the last gutter N4 no parking positions must be provided because, starting from these gutters, the next gutter is arranged only in one defined direction.

In summarizing the above, the present invention concerns a gutter selection actuator as well as a method for gutter selection of a transmission. The gutter selection actuator has precisely one double-action gutter piston 2 and one valve device 20 and can be controlled by a common control pressure. A selector finger 4 of a selector shaft 3 can be engaged and disengaged with the gutter piston 2. The position and the movement of the gutter piston 2 is determined exclusively by the valve device.

The above description of the embodiment according to the present invention serves only for illustrative purposes and not for the purpose of limiting the invention. In the context of the invention, different changes in modifications are possible without leaving the scope of the invention or its equivalents.

What is claimed is:

1. An actuator for gutter selection in a gear positioning device for an automatic manual transmission, the actuator comprising:

a selector shaft (3) with a selector finger (4);

a gutter selection device (2) movable back and forth along an axis (X—X) into a first position and a second position;

wherein the selector finger (4) of the selector shaft (3) is configured to be moved into engagement and out of engagement with the gutter selection device (2); and a single valve device (20), wherein the first and second positions of the gutter selection device (2) are determined by the single valve device (20).

2. The actuator for gutter selection according to claim 1, wherein the gutter selection device (2) is a piston loadable by a pressure medium.

3. The actuator for gutter selection according to claim 2, wherein the piston is a double-action piston.

4. The actuator for gutter selection according to claim 3, wherein the piston has two piston surfaces (A1, A2) with differently sized surface areas.

5. The actuator for gutter selection according to claim 1, wherein the gutter selection device (2) has cutouts (9, 10, 11) configured to be engaged by the selector finger (4).

6. The actuator for gutter selection according to claim 5, wherein the cutouts (9, 10, 11) are arranged such on the gutter selection device (2) that the selector finger (4) engages the gutter selection device (2) by performing a pivot movement.

7. The actuator for gutter selection according to claim 6, wherein the selector finger (4) is configured to pivot in and out of the gutter selection device (2) in two directions.

8. The actuator for gutter selection according to claim 5, wherein a number of cutouts (9, 10, 11) in the gutter selection device (2) is smaller by one than a number of gutters (N1, N2, N3, N4) of the transmission.

9. The actuator for gutter selection according to claim 1, wherein the gutter selection device (2) is a piston loadable by a pressure medium, wherein the piston has a stroke (h) matching a spacing between neighboring gutters (N1, N2, N3, N4) of the transmission.

10. The actuator for gutter selection according to claim 1, comprising a sensor configured to identify an engaged gear of the transmission.

11. The actuator for gutter selection according to claim 1, wherein the selector finger (4) has an intermediate position in which the selector finger (4) is out of engagement with the gutter selection device (2) and the transmission.

12. The actuator for gutter selection according to claim 1, wherein the valve device (20) is a 3/2 directional control valve.

13. A method for gutter selection in a gear positioning device for an automatic manual transmission, the method comprising the steps:

positioning a gutter selection device (2), movable back and forth along an axis (X—X), in a first position depending on a desired next gutter selection;

connecting a selector shaft (3) with the gutter selection device (2);

moving the gutter selection device (2) with the selector shaft (3) into a second position so that the selector shaft (3) is positioned in a neighboring gutter; and disengaging the selector shaft (3) from the gutter selection device (2) in order to shift a gear, wherein a movement of the gutter selection device (2) from the first position into the second position is effected by precisely one valve device (20).

14. The method according to claim 13, wherein, in the step of connecting, the selector shaft (3) performs a pivot movement for engaging the gutter selection device (2), and wherein, in the step of disengaging, the selector shaft (3) performs a pivot movement for disengaging the gutter selection device (2).

15. The method according to claim 13, wherein the gutter selection device (2) is a piston having two actuatable piston surfaces (A1, A2).

16. The method according to claim 15, wherein the two piston surfaces (A1, A2) are loaded with a same control pressure and wherein the two piston surfaces (A1, A2) have a different size relative to one another.

* * * * *